(12) United States Patent
Kaplan

(10) Patent No.: US 9,009,271 B2
(45) Date of Patent: Apr. 14, 2015

(54) FOUR DIMENSIONAL (4D) INFORMATION DISTRIBUTION SYSTEM AND METHOD

(71) Applicant: Richard D. Kaplan, New York, NY (US)

(72) Inventor: Richard D. Kaplan, New York, NY (US)

(*) Notice: Subject to any disclaimer, the term of this patent is extended or adjusted under 35 U.S.C. 154(b) by 0 days.

(21) Appl. No.: 14/056,356

(22) Filed: Oct. 17, 2013

(65) Prior Publication Data

US 2014/0214546 A1    Jul. 31, 2014

Related U.S. Application Data

(63) Continuation of application No. 11/634,718, filed on Dec. 5, 2006, now Pat. No. 8,626,874.

(60) Provisional application No. 60/833,742, filed on Jul. 26, 2006.

(51) Int. Cl.
| | |
|---|---|
| G06F 15/16 | (2006.01) |
| G06Q 30/02 | (2012.01) |
| G06Q 10/06 | (2012.01) |
| H04L 29/06 | (2006.01) |

(52) U.S. Cl.
CPC ............ *G06Q 30/0267* (2013.01); *G06Q 10/06* (2013.01); *H04L 65/4084* (2013.01)

(58) Field of Classification Search
USPC .................................. 719/219; 715/848, 757
See application file for complete search history.

(56) References Cited

U.S. PATENT DOCUMENTS

| | | | |
|---|---|---|---|
| 2005/0174354 A1* | 8/2005 | Doyle et al. | 345/543 |
| 2012/0158497 A1* | 6/2012 | Knighton et al. | 705/14.49 |

\* cited by examiner

*Primary Examiner* — Ebrahim Golabbakhsh
(74) *Attorney, Agent, or Firm* — Bechen PLLC

(57) ABSTRACT

The present invention provides for a four dimensional (4D) information distribution system and method which allows on-demand and real-time transmission of time-sensitive and useful self-help data or instructional materials to user. The transmission of the 4D information can be initiated at the user's request or it can be automatically carried out based on a set of established rules, such as a schedule of events. The 4D information distribution system includes a processing device for generating the 4D information, a distribution device for transmission of the 4D information, a receiving device for accepting the 4D information, and a display device for outputting the received 4D information.

22 Claims, 6 Drawing Sheets

FOUR DIMENSIONAL (4D) INFORMATION DISTRIBUTION SYSTEM AND METHOD

CROSS-REFERENCE TO RELATED APPLICATIONS

This application claims the benefit of U.S. provisional application No. 60/833,472, filed on Jul. 26, 2006, and U.S. patent application Ser. No. 11/634,718 filed on Dec. 5, 2006, both herein incorporated by reference.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND

The present invention generally relates to a system and method for distribution of four dimensional (4D) information, or 4DHelp information, to users, and more specifically to on-demand and real-time transmission of time-sensitive and useful self-help data which enable innovative and complex user interactions with the 4DHelp information, along with an additional set of data pertaining to the self-help data that may be of potential interest to the users, such as advertising and business listings.

Currently, there exist many self-help mechanisms that attempt to expedite a user's problem-solving process by providing information relating to the user's problem, or product, at hand. For example, desktop help menus are designed to be searchable by topic, so that a user can access information pertaining to a specific subject matter or owner's manuals containing voluminous product information are provided to users for future reference when they purchase products. However, these systems fail to fully meet a user's problem-solving requirement in today's mobile and demanding consumer environment because they typically provide static information mostly in the form of two dimensional (2D) flat printed materials that cannot dynamically adapt to the user's needs in real-time and in a manner that is most suitable and convenient for the user.

Existing self-help systems only provide generalized, static (2D), and potentially obsolete information that is not customized to the user's specific needs. For example, a printed user manual provides a generalized instruction tool for the user to navigate for finding specific information, such as how to perform a particular function on a motor vehicle. This information is usually text information, printed figures, or other non-interactive materials. As a further example, an electronic help menu may be text and some related static figures, but does not include active video or interactive three dimensional instructional materials that are in motion, such as 4DHelp information. Additionally, these static manuals, as they are updated, the old manuals must be discarded or replaced as being obsolete, thereby wasting significant amounts of paper, ink and associated costs.

These existing systems cannot intelligently understand or anticipate the user's potential interest so that the systems also fail to provide additional information that could be of significant value to the user. For example, while some existing systems provide repair instructions to users, they do not have the ability to determine that the users may also be interested in business listings for repair services in addition to the instructions.

Existing self-help systems are inherently static (2D) in nature, only providing a one-way communication between the user and the information. That is, once the user requests a set of information and receives the requested materials, the user's interactive experience ends, and the user cannot immediately make additional inquiries pertaining to a subset data of the requested materials. Should the user need further specific information, the user must then resort to additional sources, such as researching through a Frequently Asked Questions (FAQ) section, calling a help line to talk to a customer service representative, or employing other techniques for finding the additional information.

Current self-help systems may also lack time-sensitivity. For example, because a user may not carry along a digital camera's owner's manual, when a problem with a digital camera occurs, the user must either blindly figure out the problem or delay use of the product until the manual can be referenced. In other situations where an electronic device may include an electronic copy of the user manual or help menu on the device, for example a laptop computer or a mobile phone, the user is still limited to the existing static (2D) help data on the device.

There currently exists mobile user assistance techniques, but these solutions fail to provide interactive three dimensional capability. One example of a mobile user assistance technique is an in-vehicle navigation system that uses a GPS device to monitor and track a vehicle position relative to a database of routing information. This system uses a static 2D flat topographical map and tracks the vehicle progress on the map. The user is provided limited interaction based on the visual feedback of watching the vehicle position updated on the screen, but is not afforded direct interactive capabilities in a 3D environment, but are rather specifically limited to 2D static maps.

There also exists three dimensional assistance guides, but these lack mobility, interactivity, and timeliness. For example, an item might come with a "how to" video, but these videos by their very nature are static and lacking interactivity. As with manuals, they also lack portability such that the user must have the item or access to the item in a time-sensitive manner to retrieve the requested information. As the complexity of electronics, consumer items and other elements of the modern world increase, so does the complexity of usability of these items. There currently does not exist a proficient system combining the various elements and techniques to thereby provide interactive 4DHelp information and pertinent sub-information to users operating in a mobile environment.

DETAILED DESCRIPTION OF THE DRAWINGS

Figure 1:
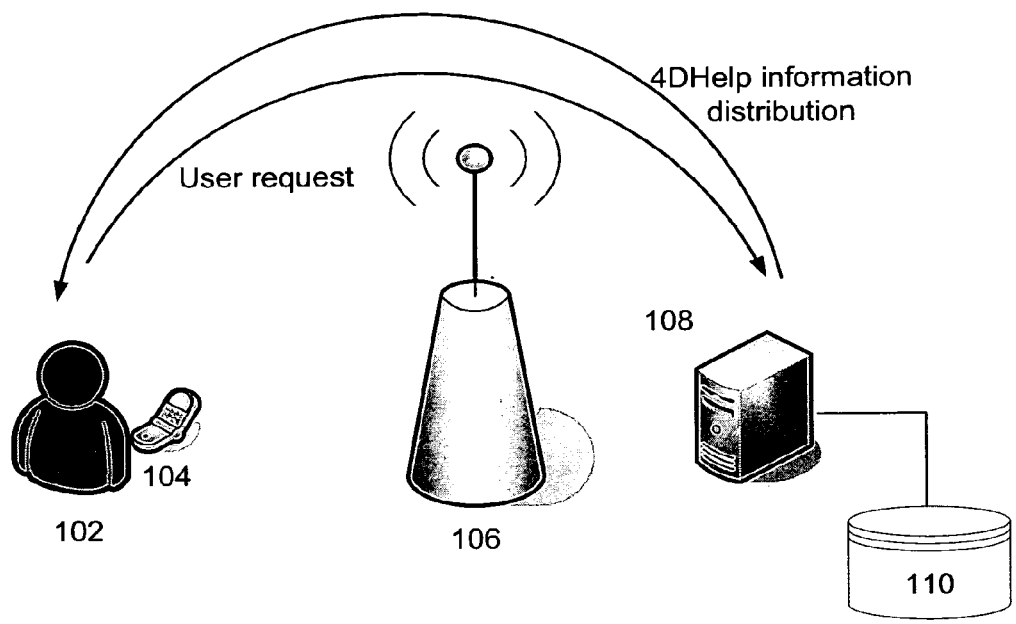
FIG. 1 is a functional block diagram illustrating one embodiment of the system overview of a 4DHelp information distribution system.

The present invention relates generally to interactive three dimensional in motion data and a distribution system for providing this data to an end user. The interactive three dimensional data is also referred to by the name four dimensional Help (4DHelp) data, as this data includes information in the fourth dimension of time, enabling the end user to navigate and manipulate this 4DHelp data. Alternatively, because the present invention includes the use of interactive three dimensional data as introduced above, 4DHelp can also be referred to as i3DHelp. The 4DHelp data includes the interactive three dimensional data being, manipulatable, navigatable, and/or rotatable over time. Additionally, this 4DHelp data may be enhanced with text and multi-party interactive natural voice functionalities, such as with speech recognition applications or interfacing to a live person. Through the distribution system, the interactive data is received and processed by a handheld or other remote device, allowing the end user to manually interact with the information, as requested.

Concurrent with 4DHelp product data, the invention further includes system information associated with various consumer products and other elements or features for which 4DHelp data may be used. One embodiment envisions a universal identification system to quantify and organize items. For example, a universal descriptive code may be applied to one or more components to provide for one of numerous available searching or otherwise identifiable techniques to allow a user time-sensitive access to information. From this universal identification system, corresponding 4DHelp data may be accurately and timely retrieved, such as using a remote device for providing a two dimensional display of the 4DHelp data which can be implemented as interactive three dimensional data.

The invention encompasses numerous aspects of the dynamic 4DHelp system. The front end includes the acquisition of the three dimensional information and the creation of the four dimensional 4DHelp information. In one embodiment, the 4DHelp information may be acquired from existing databases or other repositories of engineering information. For example, a manufacturing company may already include a repository of existing engineering or CAD-based drawings, such as an automotive manufacturing company having three dimensional CAD figures associated with various car parts and assembly drawings, which can be converted into 4DHelp information.

In another embodiment, this 4DHelp information may be generated using one or more various three dimensional modeling or CAD-based software programs. It is recognized that there are additional techniques for the data acquisition and storage, where the underlying data includes three dimensional information in 4DHelp data format, which may in one embodiment be represented in a two dimensional display.

In addition to the three dimensional components, the 4dHelp information further includes the ability for user interaction, as described above, being the fourth dimension in the 4DHelp data. This interaction component may include one or more levels of information allowing for interfacing with a user interface. For example, the 4DHelp data may include meta data associated with different components or views, where a user interface utilizes the meta data for providing different levels of interaction. For example, as described in further detail below, different 4DHelp data fields may be designated as a wheel assembly for a particular vehicle or number instruction displays for the changing of a particular tire. In another embodiment, the interaction information may be directly encoded into the 4DHelp data, usable by the user interface. Through this meta data or other levels of interaction guiding information, the interface application can then allow for the end user to have the 4DHelp information be interactive. For example, if a user seeks to rotate a particular view, voice commands may be recognized to adjust the display to another three dimensional view, thereby providing real-time 4DHelp illustration of the rotation of the three dimensional display of the underlying object or element being described.

In one operation of the invention, a user may seek to access the four dimensional information in a time-sensitive manner. The invention includes the ability for this information to be accessed, in one embodiment, using a remote or mobile device or processing system having the ability to make a wireless connection, such as a wireless enabled computer. The invention may utilize any suitable interface allowing a user to connect to an information retrieving system, such as directly connecting to a wireless service or logging onto a web-based portal or site, for example. In one embodiment, the user may enter account information or login information, if requested.

Through this connection, the user may then provide input data indicating the requested information. Various embodiments are envisioned, as recognized by one having ordinary skill in the art, for requesting information. One technique may include scanning or submitting a photograph of a component or identifier. For example, if a product has a universal identification code, this may be photographed, scanned, typed in by the user, spoken, among other input techniques. Another technique may include wirelessly reading information from the device itself, such as from an RFID tag or wireless data chip, for example.

Through the various data submission techniques, the service program may then access a database of 4DHelp data to retrieve the corresponding information. In another embodiment, further operating steps may be performed to narrow the scope of information, such as asking the user for more specific information being requested or a purpose of the information. Once the proper 4DHelp data is retrieved, this information may be submitted to the remote device. In the embodiment where the remote device is wireless, the transmission may be across a wireless network. In an embodiment where the remote device includes a hard-wired connection, the 4DHelp data may be transmitted using known hard-wired transmission techniques.

The invention may include software applications capable of playing 4DHelp information. It is further envisioned that this 4DHelp information be fully interactive, such as allowing a user to enter and receive natural language instructions and responses. For example, a person with a flat tire may ask the question: "where do I place the jack?" and this could be translated to provide a 4DHelp display of the jack-designated location on the side of the car. It is also recognized that natural language queries can be made available on the front end, such as a person asking "how do I change the tire on my 2005 Volkswagen?", for which such a person would receive human or avatar natural language responses.

Other embodiments of this invention include the pre-population of 4DHelp data on a product or wireless device prior to its sale. For example, data storage means permitting, a company that sells a mobile device may include 4DHelp data for all or a subset of its electronic components with the wireless device. In one embodiment, as a user purchases different products, the information may be provided to the remote device, such as during downtimes. For example, suppose a user has a wireless device manufactured by a particular electronics company and then purchases a video disk player by the same company, upon registration of the disk player, the company may push the 4DHelp data to the user's remote device allowing the user time-sensitive access to product information. Additionally, this service may be provided in conjunction with co-operating agreements, such as purchasing an item by one company and registering that product may allow a wireless service provider to provide users with this specific information.

In another aspect, the 4DHelp data may also facilitate the inclusion of advertising or other directed messages. In the above example of a flat tire, an intermediate server or service application may recognize one or more messages related to the flat tire and provide such messages in conjunction with the tire changing information. By way of example, one type of directed message may be an advertisement for a tire sale at a local auto store or an advertisement for a membership application to a local automobile club. It is recognized that additional direct message information may be included, such as warranty information in the event vehicle needed to be towed or was covered under a roadside assistant program or other scenarios. Regardless of the specific-listed embodiments, the 4DHelp data and the distribution system allows for the inclusion of the directed message to the user in a timely manner consistent with a user's apparent need.

FIG. 1 is a functional block diagram that illustrates one embodiment of a 4DHelp information distribution system 100. The system 100 includes a user 102, a mobile device 104, a wireless transmission device 106, a backend server 108, and a database 110. The mobile device 104 may be a mobile phone, a PDA, a mobile computing device having wireless capabilities, a smart phone, or any other suitable type of the mobile device 104 as recognized by one having ordinary skill in the art. The wireless device 106 may be one more wireless systems that may include connectivity to one or more networks, such as the Internet or a proprietary network using known connecting techniques and protocols. The backend server 108 may be one or more processing devices capable of receiving communication and accessing the database 110 as described in further detail below. The database 110 may be one or more of any suitable type of data storage device capable of storing interactive 4DHelp data as described in further detail below.

As illustrated in FIG. 1, the user 102 operates the mobile device 104. User 102 sends a user request via the wireless network 106 for assistance with a personal encounter, such as, for example, a vehicle or medical emergency. In the exemplary case of a medical emergency, user 102 may need instructions on how to perform CPR on another individual. User 102 sends a request to receive such instructional materials by inputting a message via a voice command function on the mobile device 104: "Please send me CPR instructions." As discussed in further detail below, in alternative embodiments, the user's input may be accomplished by text input on a display, scanning an object such as a barcode or a radio frequency identification device (RFID) tag, or any other suitable input techniques.

In this example, the user's request is transmitted through the wireless network 106 where the processing device 108 interprets the user request and retrieves the requested data from the database 110. In this embodiment, the database 110 stores medical instructional materials in the form of interactive 4DHelp data, as described in further detail below, and communicates the requested CPR instructions to the processing device 108. In another embodiment, the data stored on database 110 can be 2D data, such as static figures and text.

To continue service to the user 102, the processing devices 108 receives the 4DHelp data from the database 110 and transmits the interactive 4DHelp data to the mobile device 104 via the wireless network 106. The mobile device 104 receives the 4DHelp data from the processing device 108 and displays an output on a display device, such as a screen on the mobile device 104. The display device may contain capabilities of outputting the 4DHelp data as a video output, which may include an audio component, as well as text or audio capabilities for user interaction. In the present example, the received 4DHelp data may be outputted by the display device housed in the mobile device 104 as a maneuverable 4DHelp image of an individual giving CPR to another individual, so that user 102 may touch the screen of the display device or any other input device such as a plurality of buttons, voice commands, a rotary wheel, among others, to rotate, zoom, and move the 4DHelp image for better viewing perspectives. As described in further detail below, the generation of maneuverable 4DHelp images can be implemented using any suitable digital imaging or computer animation techniques, such as those presently known in the art.

Figure 2:
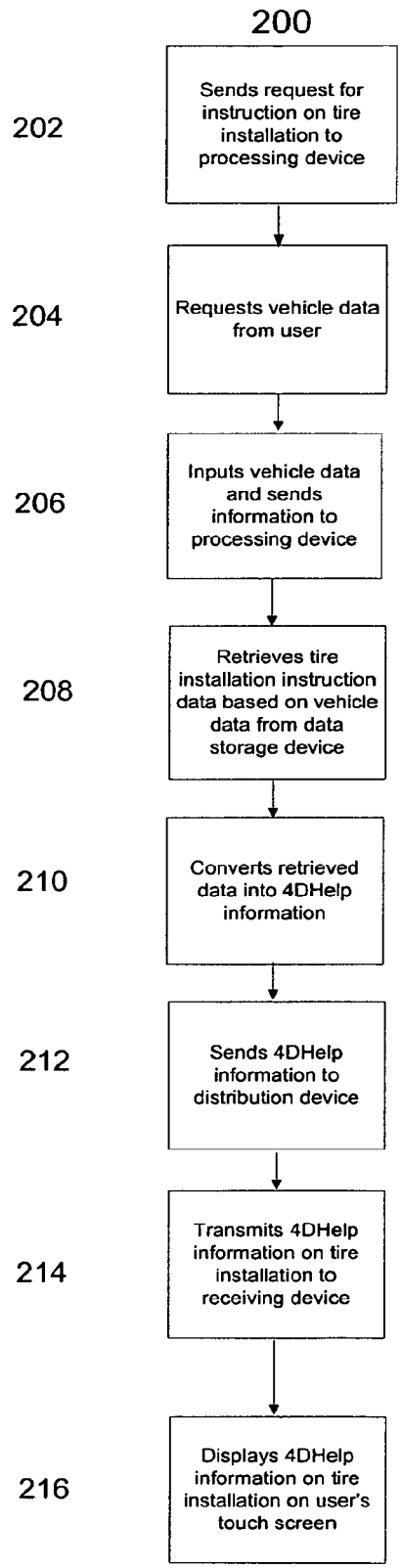
FIG. 2 is a flow chart illustrating one embodiment of the sequence of steps in a 4DHelp information distribution method.

FIG. 2 is a flow chart that demonstrates one embodiment of a 4DHelp information distribution method 200. This exemplary method relates to an embodiment of a user requesting interactive 4DHelp information for changing a flat tire. The method may be initiated by a user request in step 202, which sends a request for instructional materials. Next, in step 204, a receiver of the user request, such as a processing device similar to the processing device 108 described above with respect to FIG. 1, sends an inquiry for vehicle data from the user in order to retrieve 4DHelp instructional materials that are customized for the user's particular vehicle. In step 206, the user inputs the necessary vehicle data, such as vehicle model, make, year, and tire component identification, and sends the information to the processing device. In one example, there may be a bar code in the owner's manual or on the inside panel of a door, where this bar code may represent the vehicle information. In another example, an RFID tag may be embedded in the vehicle so that an RFID tag reader housed in the mobile device can read this information. In yet another example, the mobile device may be an internal computing system, e.g. navigation system, on the vehicle so the 4DHelp information may already be included in the above-mentioned mobile device.

In step 208, the processing device retrieves data instructions for changing a flat tire from a data storage device similar to the data storage device 110 described above, according to the vehicle data received from the user. This spare tire installation may include steps for placing safety flares in the road, removing a jack and the spare tire from the trunk, jacking up the car, removing the flat tire, installing the spare tire and replacing the tire jack in the vehicle. After the data storage device communicates the requested tire installation instructions to the processing device, the processing device may convert the raw data into 4DHelp information by enabling user interaction with the images rendered by the 4DHelp information in step 210. As described in further detail below, this may include associating interactive data to the 4DHelp information, which allows for a user to interact with the instructions, interrupt the instructions for asking non-sequential instructions, contacting additional sources of assistance, or other interactive or assistance techniques.

Thereafter, in step 212, the processing device sends the 4DHelp information to a distribution device, which transmits the 4DHelp tire installation information to a receiving device in step 214. Finally, in step 216, the receiving device houses a display device which visually outputs the 4DHelp tire installation information on the user's touch screen as a 2D display of interactive 4DHelp images, and the user is able to maneuver the images as necessary. Additionally, the user may utilize the other elements of the mobile device for interactive capabilities with the 4DHelp information, such as described below with respect to FIG. 4.

Figure 3:
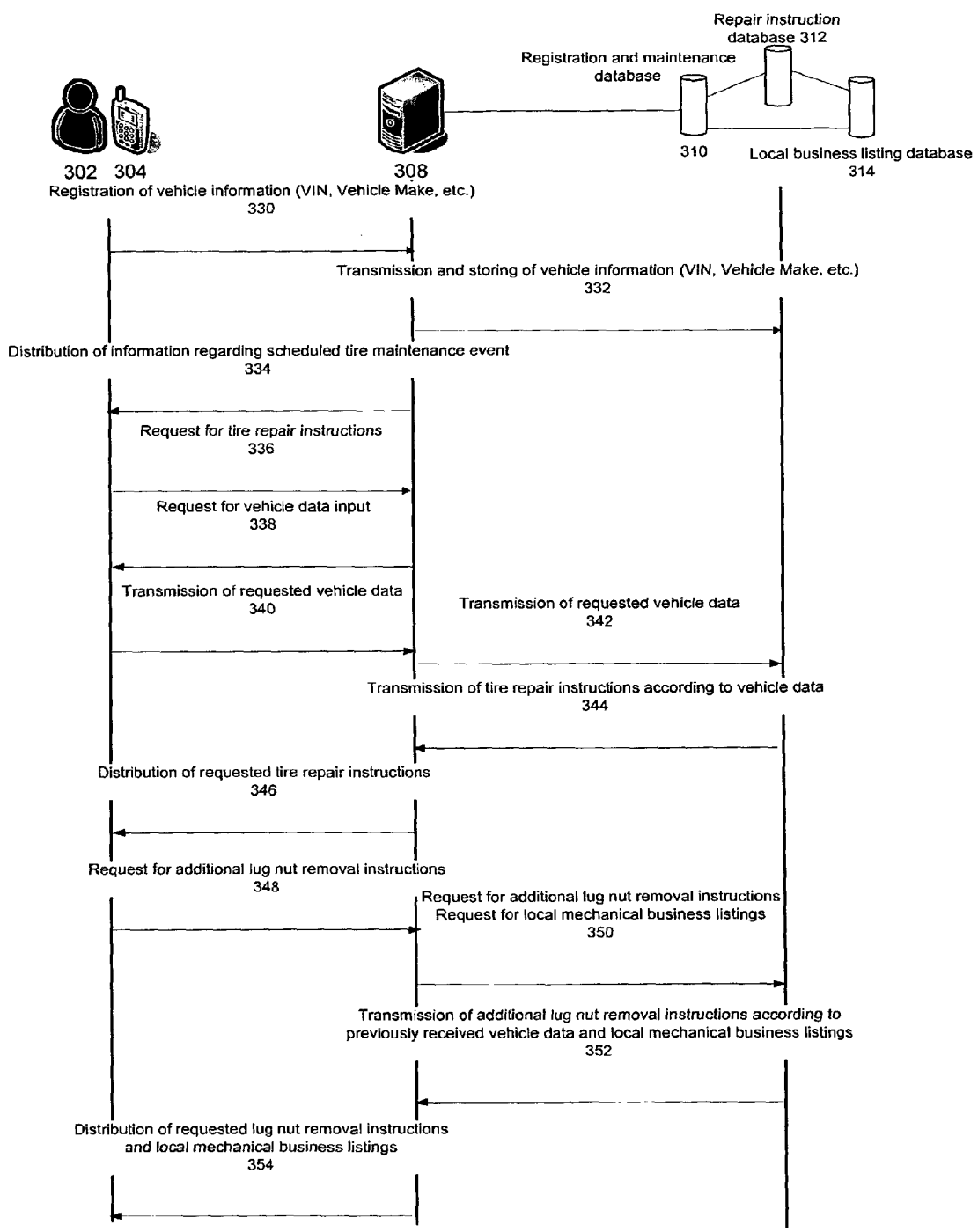
FIG. 3 is a data flow diagram illustrating one embodiment of the distribution of 4DHelp information to assist a user encountering a vehicle emergency.

FIG. 3 illustrates a data flow of one embodiment of the utilization of interactive 4DHelp information. In this 4DHelp information distribution example, truck driver 302 carries a mobile device 304, whose functionality and examples are described above for the mobile device 104 illustrated in FIG. 1. When truck driver 302 first purchased the vehicle, the driver registered the vehicle's data and a corresponding maintenance schedule by scanning an identification code located on the truck with an RFID scanning device for example, which can be implemented inside the mobile device 304, in 330. The identification code had been previously configured by the truck manufacturer before the vehicle left the manufacturing facility; it uniquely identifies the truck by capturing information including vehicle make, model, year, and various data for the components in the truck, including tire model. Additionally, the identification code also captures a schedule of maintenance events that is especially designed for the truck. When the user scans the truck's identification code with the mobile device 304, the vehicle's data as well as its maintenance schedule are transmitted to processing device 308, whose functionality is exemplarily described above for the processing device 108 illustrated in FIG. 1.

In 332, the processing device 308 transmits and registers the vehicle data and maintenance schedule in data storage device 310, whose functionality and examples are described above for the data storage device 110 illustrated in FIG. 1. In this example, the data storage device 310 maintains registration and maintenance information for vehicles. Additionally, the data storage device 310 is connected in a network of databases with data storage devices 312 and 314, which maintain repair instructions for vehicles and local business listings, respectively. The maintenance schedule may be a set of data that contains a date field, which indicates when a vehicle maintenance task should be completed.

The processing device 308 performs periodic retrieval of 4DHelp data based on the date field in order to distribute reminder information. In this embodiment, the processing device 308 distributes reminder for tire rotation at a predetermined time period, for example three weeks before the vehicle maintenance due date, in 334. In this example, the user 302 may choose to ignore the reminder and continue to drive the truck without rotating the tires.

After certain passage of time, due to over usage of the truck's tires, one of them becomes flat and the truck breaks down on the side of the road in an isolated area. User 302 requests for tire installation instructions by making voice commands via the mobile device 304, in 336. The processing device 308 receives the user requests and responds with an inquiry for vehicle data in 338. User 302 inputs the vehicle data by scanning the vehicle's identification code with the mobile device 304, which transmits the requested vehicle data to the processing device 308, in 340. The processing device 308, in turn, transmits the vehicle data to data storage device 312 to retrieve the tire installation instructions customized for user 302's truck in 342. The requested instruction information is immediately collected and transmitted from the repair instructions database 312 in 344 and distributed to user 302 in 346.

Due to user 302's lack of experience with tire installation, the flat tire still cannot be replaced because user 302 does not know how to remove the lug nut from the spare tire. User 302 makes additional communication with the processing device 308 via the mobile device 304, which has maintained an open communication channel with the processing device 308 in the meantime to allow additional levels of user inquiries. User 302 sends a request for lug nut removal instructions to the processing device 308 in 348. In 350, the processing device 308 transmits the request to the repair instructions database 312 to retrieve lug nut removal instructions. At the same time, the processing device 308 determines that the additional user request means that user 302 is having difficulty with tire repair. As such, the processing device 308 locates the mobile device 304 via GPS capability implemented on the mobile device 304, and transmits location information to the data storage device 314, which contains a list of business listings. According to the location information received, the processing device 308 collects listings of automotive repair shops that are located near where user 302 encountered the vehicle emergency, along with lug nut removal instructions from the data storage device 312 in 352.

Finally, in 354, the processing device 308 distributes lug nut removal instructions as well as a set of local automotive repair business listings to the mobile device 304 for output to user 302. As with previous instructions, the lug nut removal image may be a 4DHelp display with user interaction, such as allowing a user to rotate or otherwise manipulate the image, such as for example viewing the lug nut removal from a different perspective. From the mobile device 304, user 302 may choose to call an auto shop by dialing the telephone number displayed for expert assistance with tire replacement. As discussed in further detail below with respect to FIG. 8, various types of additional data may be included with the interactive 4DHelp data, including advertising information, club membership information (e.g. auto club information for a flat tire) or other suitable information, which may be pertinent to the subject of the 4DHelp.

Figure 4:
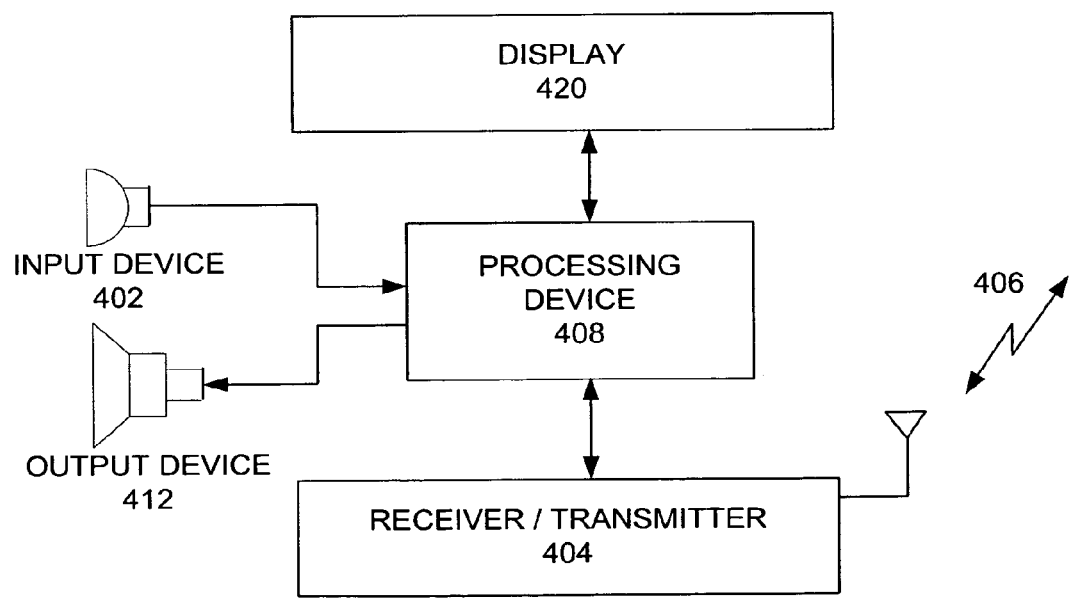
FIG. 4 is a block diagram illustrating one embodiment of a mobile device used in the 4DHelp information distribution system.

FIG. 4 is a block diagram that illustrates one embodiment for a mobile device component used in the 4DHelp information distribution system. The mobile device comprises an input device 402, which accepts and interprets input from a user, such as a microphone capable of voice command functions, or a keyboard with text input capabilities. It also includes receiver/transmitter 404, which operates to transmit user request initiated by the user and receive the requested data via a networked communication environment or a wireless environment 406. The receiver/transmitter 404 may operate in accordance with any known mobile techniques for transmitting and receiving communications.

Additionally, processing device 408, whose exemplary functionality is described above for the processing device 108 in FIG. 1, can be implemented to provide visual display of all or portions of the received data and enable adjustment of the visual display by the user in display 420. The adjustment of the display may be accomplished using any suitable interactive technique, such as a tactile interface to allow a user to rotate an imagine, a touch screen interface to allow a user to perform various touch screen operations, voice input capabilities through various voice recognition techniques, on screen interactive commands, or any other suitable techniques as recognized by one having ordinary skill in the art.

Additionally, audio output device 412 can be implemented in the mobile device so that rather than visually displaying the data retrieved by the processing device 408, the retrieved data can be outputted in audio announcements to the user. In another embodiment, the input device 402 and the audio output device 412 are further equipped with natural language engines so that voice command functions are capable of recognizing natural languages.

In a further embodiment, the processing device 408 retrieves 4DHelp data from a data storage device that is implemented as a local memory within the processing device 408. Alternatively, in the wireless communication environment 406, the processing device 408 retrieves 4DHelp data from a data storage device that is implemented as an external database or a network of external databases that store three or two dimensional data. For example, in the tire repair example provided in FIG. 3 above, the data storage devices 310, 312, and 314 can be maintained by various truck manufacturers, tire manufactures, and auto repair businesses who would like to provide better customer service by taking advantage of the 4DHelp information distribution system and sending maintenance reminders, repair instructions, and/or advertisements to customers.

Figure 5:
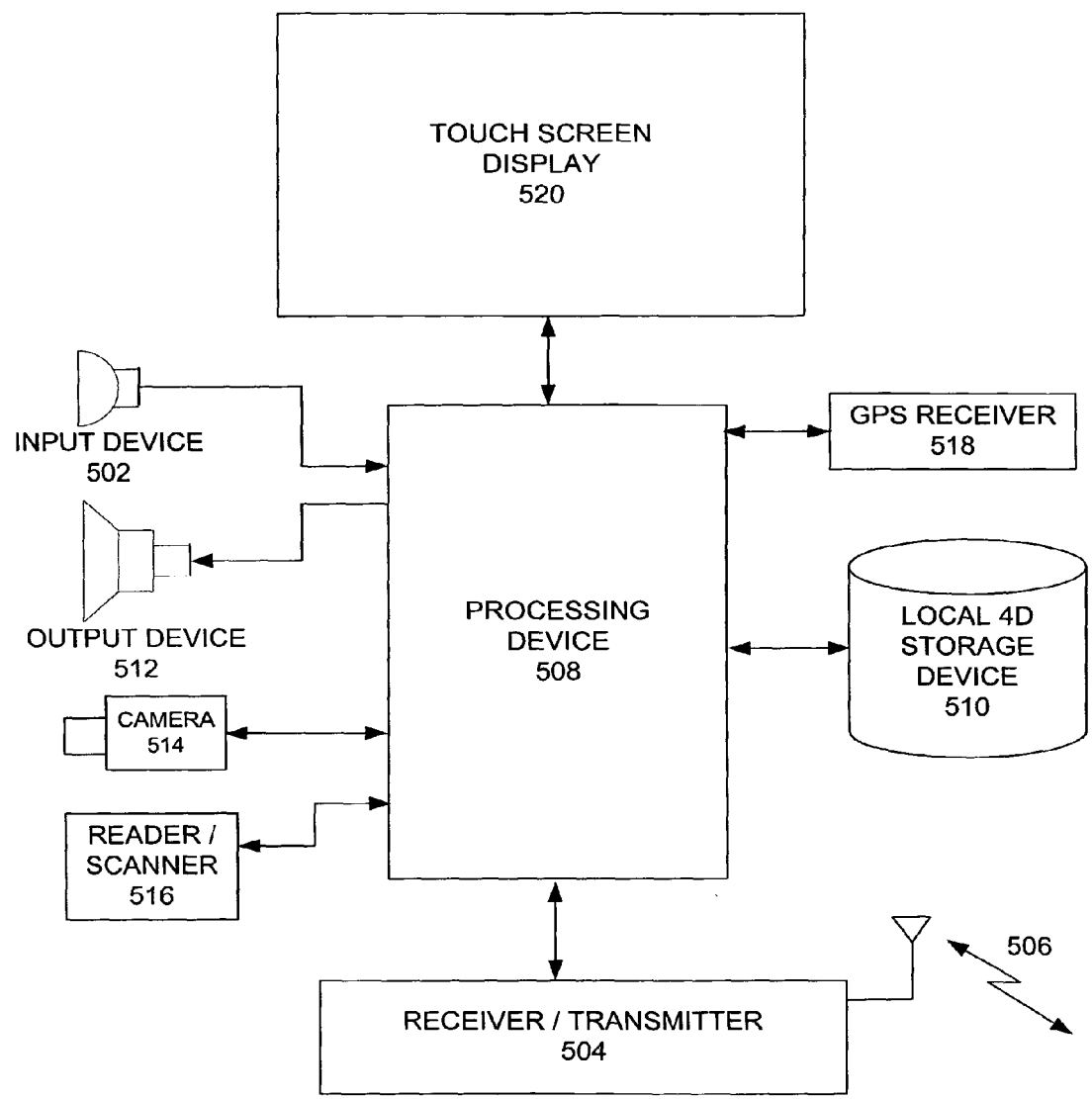
FIG. 5 is a block diagram illustrating another embodiment of a mobile device used in the 4DHelp information distribution system.

FIG. 5 is functional block diagram that illustrates another embodiment of a mobile device as a component in the 4DHelp information distribution system. The exemplary mobile device comprises a processing device 508, receiver/transmitter 504, display 520, input device 502, and output device 512. The processing device 508, receiver/transmitter 504, input device 502 and output device 504 may be similar to the mobile device components described above with respect to FIG. 4 and the display 520 may be similar to the display of FIG. 4, although including touch screen capabilities. Transmission of data can be accomplished via wireless network 506. Additionally, the exemplary mobile device also contains a reader/scanner 516, such as a radio frequency identification device, to enable user input by scanning an object, as described in the example embodied in FIG. 3 above. Further, the exemplary mobile device may include GPS receiver 518 to provide location information as usable with the mobile device in conjunction with the 4DHelp interactive information application.

In one embodiment, a camera 514 can also be implemented as an integrated component in the mobile device as an alternative identification device for the user. For example, instead of identifying the object that needs repair by scanning the object with reader/scanner 516, the user may use the camera 514 to take a picture of the object and transmit the image to the processing device 508 for identification. In another embodiment, the camera 514 may allow for visual feedback to an assistant, such as a customer service representative, for example if the user is having problems with an item, the user may take a picture or capture video of the problem and submit the visual feedback to the customer service representative in a proximate real-time fashion. More specifically, in the example embodied in FIG. 3 above, when user 302 does not know the name of the mechanical part that needs to be removed from the spare tire (i.e. a lug nut), the user may capture the lug nut pictorially using the camera 514 in the mobile device. Finally, a local data storage device 510, whose functionality is introduced above for the local memory in FIG. 4, is provided for the mobile device embodied in FIG. 5, to allow faster access of 4DHelp information that are helpful to the user.

Figure 6:
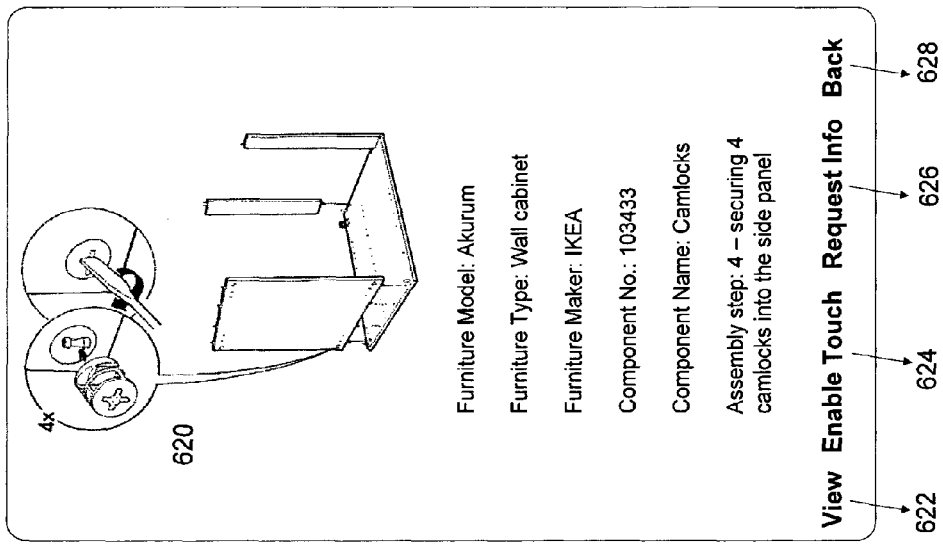
FIG. 6 is a screen shot illustrating one embodiment of a user interface for a mobile device used in the 4DHelp information distribution system.

FIG. 6 illustrates a representative example of a screenshot that may be visible on a user interface of a mobile device used in the 4DHelp information distribution system. The user interface contains a touch screen display 620, whose functionality is described in further details below. In the embodiment illustrated, user is attempting to assemble a piece of furniture that was purchased from IKEA and has encountered difficulty in securing a set of camlocks into one of the side panels.

The user initiates a request by scanning an identification code located on the packaging for the camlocks with a receiver/scanner device known to one of skill in the art, including for example, the receiver/scanner 516 described in FIG. 5 above. After the receipt of the user request, a processing device, such as the processing device 508 described in FIG. 5, retrieves instructions regarding the camlocks from an external database storage device, such as the database storage device 110 described in FIG. 1, and transmits the instructions to the mobile device.

Continuing with this embodiment, the instructional information is displayed on the user interface. Specifically, the upper portion of the touch screen display 620 shows a 4DHelp image of a camlock being secured into a side panel. The middle portion of the touch screen display 620 shows text information regarding the furniture piece and component item. For example, in the embodiment described herein, furniture type is shown to be a "wall cabinet," furniture maker is shown to be "IKEA," component number is shown to be "103433," and "assembly step" inquired is shown to be "securing 4 camlocks into the side panel." Lastly, the bottom portion of the touch screen display 620 shows touch buttons that allow user interactions, such as "View" button 622, "Enable Touch" button 624, "Request Info" button 626, and "Back" button 628. The functionality of each touch button can be implemented according to available capabilities known to one skilled in the art. For example, "Enable Touch" button can be implemented such that after the user touches the button, the user can rotate the 4DHelp image shown on the upper portion of the touch screen display 620 by touching a particular part of the screen, and dragging the 4DHelp image with the touch of a finger. In the meantime, a new "Disable Touch" button is shown to be available to the user at the bottom portion of the touch screen display 620 such that the user can touch the button to disable the touch screen function.

4DHelp images may be generated in this system based on any suitable generation technique. As described below, the 4DHelp images include additional data allowing for user interaction, whereas the base 3D data field is available for multi-dimensional rotation. By way of example, a user may generate 4DHelp images based on three dimensional data using a commercially or publicly available software application, such as a graphics or CAD system or a sketch-up technique. As another example, the user may utilize a 3D scanner, such as one currently available from NextEngine to generate a 3D model. Additionally, the meta data may be assigned to the 3D data to thereby allow user interactivity. It is also recognized, the 3D data may be acquired from other existing sources, such as a CAD or design database, three dimensional mapping database, a video database or any other suitable source.

Figure 7:
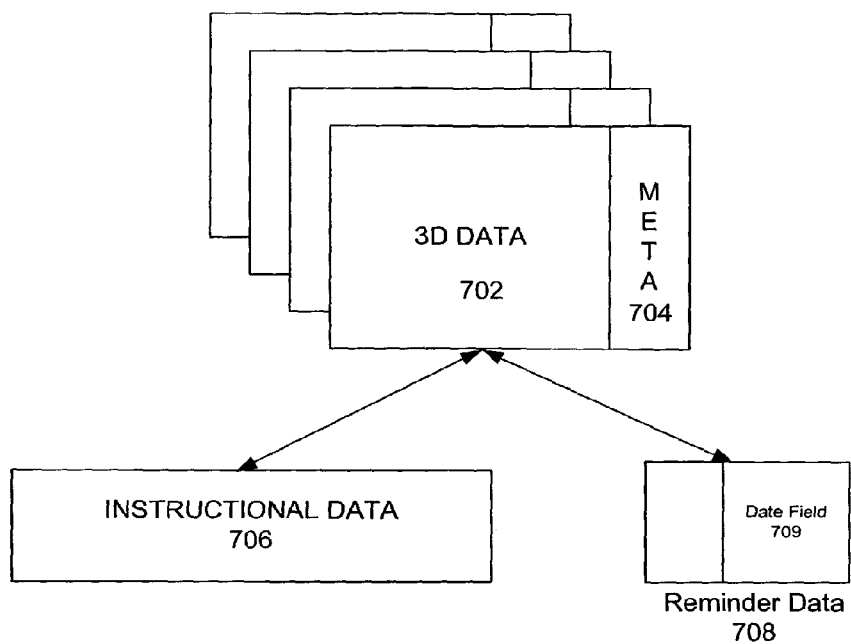
FIG. 7 is a block diagram illustrating one embodiment of the data structure used to implement the 4DHelp information data.

FIG. 7 is a block diagram that illustrates the data structure for the 4DHelp information as a component of the 4DHelp information distribution system. In the disclosed embodiment, the data structure includes three dimensional (3D) data 702, which can be implemented as any 3D data structure known to one skilled in the art, for example, as a sequence of frames of 3D data. The substance of the 3D data 702 may be any type of information, such as in various exemplary embodiments of product data or healthcare recommendations. In another embodiment of the invention, the 3D product data 702 may include CAD drawings from manufacturers, a product identifier (i.e. an unique identification code), maintenance information regarding the product, and product repair instructions. The data structure also includes meta data 704 which can be used to describe and identify each set of 3D data with which it is associated. For example, if the 3D data 702 contains product data directed to automotive parts for a 2007 Acura MDX, then the meta data 704 contains descriptors, such as "Acura," "SUV," "MDX," etc. Finally, the data structure for the 4DHelp information may also include instructional data 706, which enables user interaction with the 3D data. In another embodiment of the invention, the instructional data 706 is an interactive program that maintains an open communication channel between an input source, such as a user of a mobile device with voice command functions, and an output source, such as an operator who provides real-time customer service to the user of the 4DHelp information distribution system. Alternatively, the instructional data 706 may be implemented as an interactive program that allows for radio frequency identification capabilities.

In further embodiments of the invention, the data structure for the 4DHelp information may also include reminder data 708, which can be data regarding a set of scheduled events, such as a vehicle maintenance schedule for the vehicle whose data is contained in the 3D data 702, and described by the meta data 704, or a healthcare checkup schedule. Reminder data 708 may be implemented to include date field 709, which indicates when a scheduled task should be completed, as described in example embodied in FIG. 3. Processing devices that are available to one of ordinary skill in the art, similar to components 108, 308, 408, and 508 as they are described in FIGS. 1, 3, 4, and 5 respectively, can retrieve and distribute the reminder data 708 to users based on the date field 709, such that users have sufficient time to respond and attend to the reminders.

The 3D data may be viewed or interacted with one or more types of existing applications. For example, one technique may include existing three dimensional interactive software, such as an iPix application. Additionally, the data may be viewed through a standard browser or other types of applications that allow for user interaction, including for example embedded image interaction buttons or queues. In another embodiment, a standard viewer may be combined with voice recognition and image rendering techniques, such as those found with video gaming consoles, to allow for the dynamic image generation or the three dimensional interaction based on user inputs. It is recognized by one having ordinary skill in the art that there exists various other techniques for displaying and facilitating the interaction of the 3D data and the above-discussed examples are not meant to be so limiting as noted herein.

Figure 8:
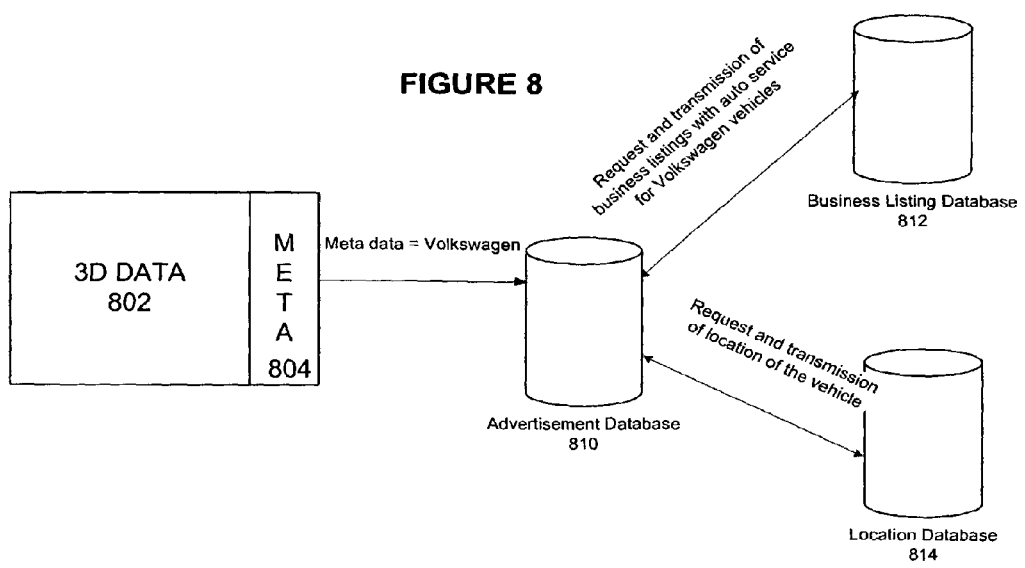
FIG. 8 is a block diagram illustrating one embodiment of a method for distribution of directed advertising as the 4DHelp information to a user and its associated database arrangement.

FIG. 8 is a block diagram that illustrates one embodiment of a method for distribution of directed advertising as the 4DHelp information to users and its associated database arrangement. As described in previous embodiments, the distribution of advertisement can be accomplished in a networked or wireless communication environment. One embodiment of the proposed method includes the step of determining a user request seeking 4DHelp instructional data related to a Volkswagen vehicle as indicated by meta data 804, which describes the contents of 3D data 802, as similarly disclosed in the example embodied in FIG. 7. Once it is decided that the meta data 804 identifies information pertaining to Volkswagen, the directed advertising distribution method searches advertisement database 810, whose functionality and examples are described above for database 110 in FIG. 1, to determine promotional data that is related to Volkswagen vehicles. In another embodiment of the invention, the promotional data can be of one or more topics that are related to the subject matter indicated by the meta data 804. For example, promotional data can include coupons from Volkswagen dealerships, or offerings from automotive service clubs, such as AAA.

This embodiment of the invention further includes the steps of associating the promotional data with the 4DHelp instructional data initially requested by the user and providing the promotional data along with the requested 4DHelp instructional data to the user. To associate the promotional data with the 4DHelp instructional data, another embodiment of the invention allows a multi-media display to be embedded with the 4DHelp instructional data such that when the user activates the 4DHelp instructional data through actions such as enabling touch screen functionality, the related promotional data appears as a multi-media display.

In another embodiment of the invention, an additional layer of intelligence is added such that the method includes the steps of determining the location where the user entered the user request and selecting promotional information, such as business listings, based on the location. In this embodiment, the advertisement database 810 is organized as a relational database with connections to business listing database 812 and location database 814. The exchange of information amongst the databases 810, 812, and 814 ensures that the user receives business listings that are substantively relevant and physically accessible.

In a further embodiment of the invention, the user may register personal information, similar to the registration of vehicle data as described for the example embodied in FIG. 3. For instance, the user may choose to register personal contact information, car insurance information, state vehicle registration information, and automotive service subscriptions. It may be implemented such that another embodiment of the invention includes the steps of retrieving the stored personal information and selecting promotional information based on the personal information to provide further customization in addition to the location where the user entered the user request. For example, if the registered personal information indicates that the user is an AAA member, then one embodiment of the invention selects an AAA-participating vehicle towing business that is closest to where user is currently located.

The inclusion of pertinent or non-pertinent information includes other embodiments, such as a product warranty or registration. For example, a user may be allowed or granted 4DHelp capabilities for a product if they register the product with the manufacturer. Therefore, the pertinent information may pertain to the product itself or warranty information, such as indicating that the item is still under warranty and can be returned for authorized repairs. The data may also be non-pertinent, such as generalized advertising similar to banner advertising on a web page, where the initial advertisements are general but may be later customized based on further levels of user interaction.

Finally, the promotional information provided to the user can be in the format of an electronic message, such as a SMS message, an instant message, an electronic email communication or attachment, or a facsimile, depending on the mechanism at which the user will be receiving the information.

Various other techniques are envisioned to encompass the distribution of additional information based on the access of the 4DHelp application, including sending additional information that can have additional levels of interactivity, such an active link to a web site or a verification code for future online or offline activities, such as purchasing a new product based on the use of the help application, for example a $5 off coupon for an online retailer as an incentive for using the 4DHelp application.

Therefore, 4DHelp information is provided in a mobile environment, where the 4DHelp information is timely with interactive three dimensional information. This 4DHelp information includes 3D data with associated meta data structures as are readable by a mobile device. Additionally, back end systems allow for the recognition and inclusion off ancillary or additional data to the interactive three dimensional data transmitted in the mobile environment.

Several embodiments of the present invention are specifically illustrated and described herein. However, it will be appreciated that modifications and variations of the present invention are covered by the above teachings and within the purview of the appended claims without departing from the spirit and intended scope of the invention.

What is claimed is:

1. A method for directed advertising in a wireless data transmission system, the method comprising:
   determining a user input request for interactive three dimensional instructional data;
   determining related promotional information associated with the interactive three dimensional instructional data;
   associating the related promotional information with the interactive three dimensional instructional data selected based on the user input request; and
   providing the related promotional information and the interactive three dimensional instructional data to an end user.

2. The method of claim 1 wherein the promotional information includes directed advertising to one or more topics relating to the content or purpose of the interactive three dimensional instructional data.

3. The method of claim 2 wherein the promotional information relates to services for an assistant to perform a task of the interactive three dimensional instructional data.

4. The method of claim 1 further comprising:
   recognizing a location of the transmission of the user input request; and
   selecting the related promotional material also based on the location.

5. The method of claim 1 wherein the promotional information includes a promotional coupon for goods or services associated with the interactive three dimensional instructional data.

6. The method of claim 1 further comprising:
   recognizing the user providing the user input request;
   retrieving stored registration information associated with the user; and
   personalizing the promotional information to the user.

7. The method of claim 6 further comprising:
   generating an electronic message; and
   providing additional promotional information via the electronic message.

8. The method of claim 7 wherein the electronic message may be one: a SMS message, an instant message, an electronic mail communication, an electronic mail communication attachment or a facsimile.

9. An apparatus for directed advertising in a wireless data transmission system, the apparatus comprising:
   a three dimensional instructional data database having interactive three dimensional instructional data stored therein;
   a promotional information database having promotional information stored therein; and
   a processing device, coupled to the databases, operative to, in response to executable instructions:
      determine a user input request for the interactive three dimensional instructional data and retrieve the data from the instructional database;
      determine related promotional information associated with the interactive three dimensional instructional data and retrieve the information from the information database;
      associate the related promotional information with the interactive three dimensional instructional data selected based on the user input request; and
      provide the related promotional information and the interactive three dimensional instructional data to an end user.

10. The apparatus of claim 9 further comprising:
    a receiver operative to receive the user input request; and
    a transmitter operative to transmit the promotional information and the interactive three dimensional instructional data.

11. The apparatus of claim 10 wherein the promotional information includes directed advertising to one or more topics relating to the content or purpose of the interactive three dimensional instructional data.

12. The apparatus of claim 9 wherein the promotional information relates to services for an assistant to perform a task of the interactive three dimensional instructional data.

13. The apparatus of claim 9, wherein the processing device, in response to executable instructions, is further operative to:
    recognize a location of the transmission of the user input request; and
    select the related promotional material also based on the location.

14. The apparatus of claim 9 wherein the promotional information includes a promotional coupon for goods or services associated with the interactive three dimensional instructional data.

15. The apparatus of claim 9, wherein the processing device, in response to executable instructions, is further operative to:
    recognize the user providing the user input request;
    retrieve stored registration information associated with the user; and
    personalize the promotional information to the user.

16. The apparatus of claim 15, wherein the processing device, in response to executable instructions, is further operative to:
    generate an electronic message; and
    provide additional promotional information via the electronic message.

17. The apparatus of claim 16 wherein the electronic message may be one: a SMS message, an instant message, an electronic mail communication, an electronic mail communication attachment or a facsimile.

18. A method for directed advertising in a wireless data transmission system, the method comprising:
    receiving a data request from a mobile device;
    determining a user input request for interactive three dimensional instructional data from the data request;
    determining related promotional information associated with the interactive three dimensional instructional data;

associating the related promotional information with the interactive three dimensional instructional data selected based on the user input request; and transmitting the related promotional information and the interactive three dimensional instructional data to the mobile device of the end user, wherein multi-media display of promotional information is outputted in conjunction with user activation of the interactive three dimensional instructional data and the promotional information includes directed advertising to one or more topics relating to the content or purpose of the interactive three dimensional instructional data.

19. The method of claim 18 further comprising:
recognizing a location of the transmission of the user input request; and
selecting the related promotional material also based on the location.

20. The method of claim 18 wherein the promotional information includes a promotional coupon for goods or services associated with the interactive three dimensional instructional data.

21. The method of claim 18 further comprising:
recognizing the user providing the user input request;
retrieving stored registration information associated with the user; and
personalizing the promotional information to the user.

22. The method of claim 21 further comprising:
generating an electronic message; and
providing additional promotional information via the electronic message where the electronic message may be one: a SMS message, an instant message, an electronic mail communication, an electronic mail communication attachment or a facsimile.

* * * * *